United States Patent [19]

Hansen

[11] 4,219,074
[45] Aug. 26, 1980

[54] METHOD AND APPARATUS FOR LOW-LOSS STORAGE OF THERMAL ENERGY AND FOR LOW-LOSS WITHDRAWAL OF THE STORED THERMAL ENERGY

[76] Inventor: Uwe Hansen, Am Mühlenberg 1, Schwabstedt, Fed. Rep. of Germany, 2251

[21] Appl. No.: 867,431

[22] Filed: Jan. 6, 1978

[30] Foreign Application Priority Data

Jan. 11, 1977 [DE] Fed. Rep. of Germany ....... 2700822

[51] Int. Cl.² ............................................. F28D 21/00
[52] U.S. Cl. .................................... 165/45; 165/104 S
[58] Field of Search ........... 165/104 S, 45, 1, DIG. 4; 126/400

[56] References Cited

U.S. PATENT DOCUMENTS

| | | | |
|---|---|---|---|
| 3,163,209 | 12/1964 | Shinn | 165/163 X |
| 4,010,731 | 3/1977 | Harrison | 165/104 S X |
| 4,011,736 | 3/1977 | Harrison | 165/45 X |
| 4,042,012 | 8/1977 | Perry et al. | 165/45 X |
| 4,114,600 | 9/1978 | Newton | 165/104 S X |
| 4,117,882 | 10/1978 | Shurcliff | 165/104 S |

Primary Examiner—Albert W. Davis
Attorney, Agent, or Firm—Herbert L. Lerner

[57] ABSTRACT

Method of low-loss thermal energy storage in and withdrawal from a heat accumulator connected with an energy source and a heat consumer in a circulatory system through which a heat-carrying flow medium circulates which includes passing the flow medium through the energy source so as to withdraw thermal energy from the energy source and effect absorption of the thermal energy by the flow medium, guiding the flow medium in respective layers within the heat accumulator in a direction from the center of the heat accumulator toward the periphery thereof so as to store the thermal energy in a heat storage mass disposed in the heat accumulator; and guiding the flow medium in the layers thereof through the heat accumulator in a direction from the periphery of the heat accumulator to the center thereof, and passing the flow medium from the heat accumulator through the consumer so as to withdraw thermal energy therefrom and transfer it to the consumer; and apparatus therefor.

9 Claims, 1 Drawing Figure

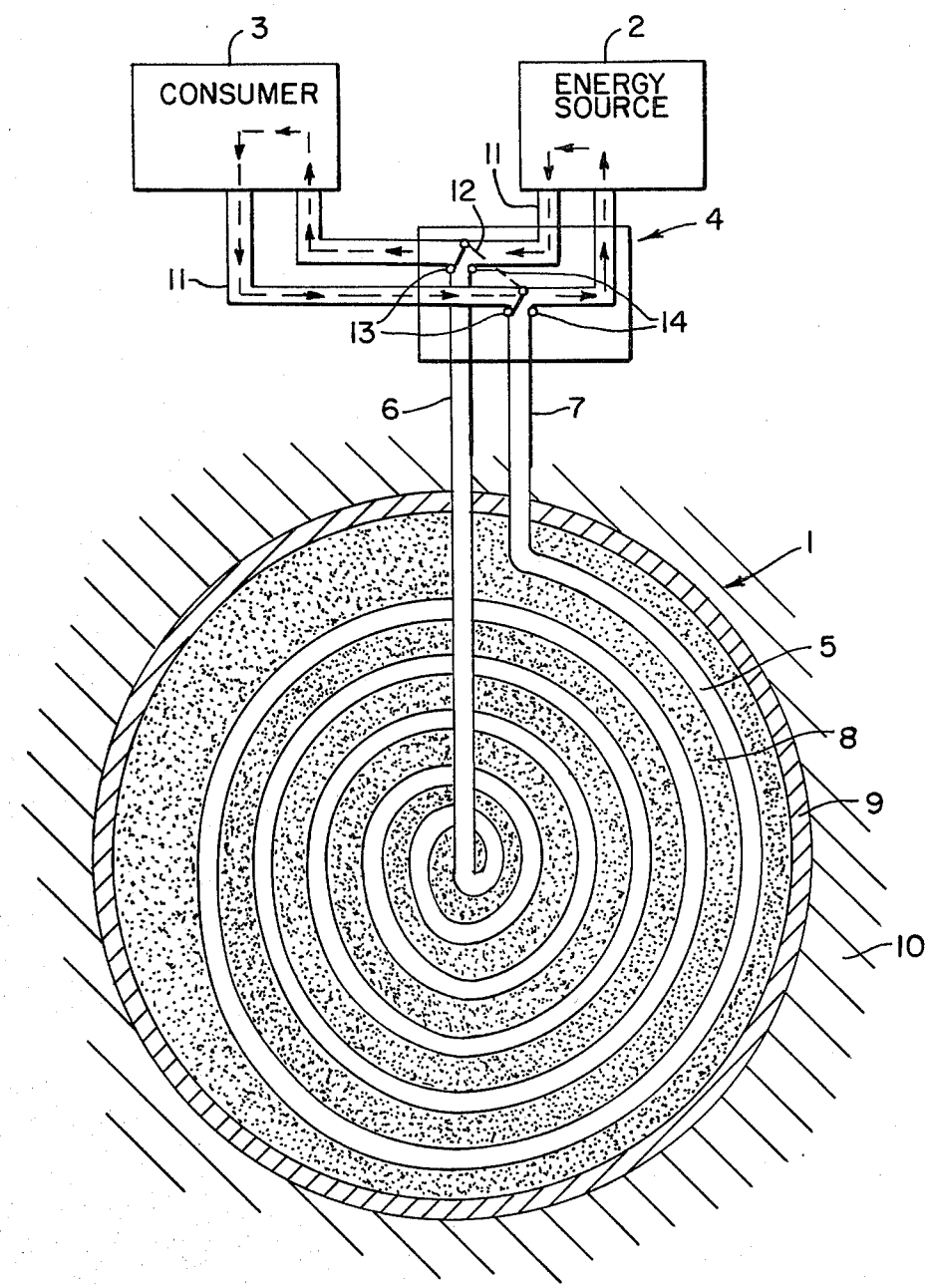

METHOD AND APPARATUS FOR LOW-LOSS STORAGE OF THERMAL ENERGY AND FOR LOW-LOSS WITHDRAWAL OF THE STORED THERMAL ENERGY

The invention of the instant application relates to a method for low-loss thermal energy storage in and withdrawal from a heat accumulator using a flow medium, preferably liquid, which is suitable as a heat carrier. For storing the thermal energy, the flow medium flows in circulating operation through the energy source and the heat accumulator, and for withdrawing the stored thermal energy, in circulating operation through the heat accumulator and the consumer.

In conventional systems for storage and withdrawal of stored thermal energy from a heat accumulator, the water which serves as the flow medium for the heat transfer simultaneously serves as the heat storage medium. This water is heated up in a tank, usually a steel or concrete tank, serving as the heat accumulator, and is fed to the consumer through local withdrawal in a circulation process.

Because of the relatively high thermal conductivity of the water, assisted by the continuous mixing due to the circulating operation, the water in the tank has the tendency to provide rapid temperature equalization or equilibrium overall. The greater the temperature gradient, accordingly, the greater is the amount of heat which flows in direction of the temperature drop. Since, in this conventional device, the greatest temperature gradient exists, however at the transition between the heated water and the wall of the tank, there occurs a continuous flow of heat from the center of the water tank to the edge of the tank and usefulness of the heat is lost there.

Since this is undesirable, the walls of the tank, according to the heretofore known heat accumulator, have been provided with a layer of insulation. However, in order to keep the amount of loss within reasonably justifiable limits, the insulation layers had to be made so thick (about 500 mm) that an economical use of such heat accumulators could hardly be considered to be feasible from a cost aspect.

It is therefore an object of the invention to avoid the disadvantages of the heretofore known apparatus and method and thus to provide a heat accumulator having heat losses that are as low as possible yet requiring only a reasonable outlay for insulation.

With the foregoing and other objects in view, there is provided in accordance with the method of the invention, a method of low-loss thermal energy storage in and withdrawal from a heat accumulator connected with an energy source and a heat consumer in a circulatory system through which a heat-carrying flow medium circulates which comprises passing the flow medium through the energy source so as to withdraw thermal energy from the energy source and effect absorption of the thermal energy by the flow medium, guiding the flow medium in respective layers within the heat accumulator in a direction from the center of the heat accumulator toward the periphery thereof so as to store the thermal energy in a heat storage mass disposed in the heat accumulator; and guiding the flow medium in the layers thereof through the heat accumulator in a direction from the periphery of the heat accumulator to the center thereof, and passing the flow medium from the heat accumulator through the consumer so as to withdraw thermal energy therefrom and transfer it to the consumer.

Through this layer-wise heating of the heat storage mass of the heat accumulator from the inside to the outer periphery, the heat flow caused by the prevailing temperature gradient in this direction is utilized as useful heat until a limit has been reached at which the heat accumulator has become fully heated i.e. the temperature is as high at the outer edge of the heat accumulator as it is in the core or center thereof. At that instant, a heat loss would occur therein comparatively as high as in the hereinaforementioned heretofore known storage device. However, at the instant when thermal energy is withdrawn in the heat accumulator in accordance with the method and apparatus of the invention, the flow medium flows from the outer periphery of the heat accumulator layer-by-layer in direction toward the core or center, so that the flow medium in which has been cooled down by transfer of the thermal energy to the consumer, is returned to the outer periphery of the heat accumulator and thus, the heat flow or flux normally drifting away as heat loss is largely recovered as useful heat for reheating the flow medium. In this manner, a temperature gradient is generated within the heat accumulator, extending from the core or center to the outer periphery, which becomes ever larger with increasing withdrawal of thermal energy from the heat accumulator, so that the temperature difference between the heat storage medium and the wall of the heat accumulator becomes ever smaller and the waste heat flow connected therewith even less.

In accordance with the apparatus for performing the method of the invention, there is provided an apparatus for low-loss thermal energy storage and withdrawal, comprising a pipeline wound layer-wise into a ball-like structure, the windings of the pipeline having an intermediate spacing adequate for accommodating heat-storage mass therein, the pipeline having two ends, one of which is located at the outer periphery of the ball-like structure and the other of which is located at the center of the bale-like structure, a first pipeline union connected to the one end of the pipeline, and a second pipeline union connected to the other end of the pipeline.

In accordance with another feature of the invention, also included are valve means for selectively connecting, on the one hand, the first pipeline union to a pipe inlet to an energy source and the second pipeline union to a pipe outlet from the energy source and, on the other hand, the first pipeline union to a pipe outlet from a heat consumer and the second pipeline unit to a pipe inlet to the heat consumer.

In accordance with an added feature of the invention, the ball-like structure has a substantially spiral configuration.

In order to achieve a heat flow within the heat accumulator that is as slow as possible, a heat storage medium of very low thermal conductivity should be used which, in addition, should be easily workable and as inexpensive as possible. Therefore, in accordance with a further feature of the invention, the heat-storage mass in the spacing between the pipeline windings is earth.

In accordance with an additional feature of the invention, the ball-like structure and the heat storage mass disposed in the spacing intermediate the pipeline windings forming the ball-like structure constitute a heat accumulator, and the heat accumulator is received in a cavity formed in the earth. In this manner, the heretofore conventional and very expensive tank, formed of steel or concrete, becomes unnecessary as supporting structure for the heat accumulator, since the function thereof is assumed by the earth or ground, in accordance with the invention. However, in order to effect a separation between the soil as the heat storage medium and the earth as the medium which, as a whole, surrounds the heat accumulator, in accordance with yet another feature of the invention, means are provided for forming a separating layer disposed between the heat accumulator received in the cavity and the earth defining the cavity.

In accordance with yet a further feature of the invention, the separating layer is formed of insulating material. The purpose of these features is to reduce further yet the already extremely small heat losses.

In order to attain an additional increase in the absorption of thermal energy of the heat accumulator, in accordance with yet an additional feature of the invention, the heat storage mass contains an intermixed additive of eutectic material.

In accordance with a concomitant feature of the invention, the additive of eutectic material is concentrated at the center of the ball-like structure.

Other features which are considered as characteristic for the invention are set forth in the appended claims.

Although the invention is illustrated and described herein as embodied in method and apparatus for low-loss storage of thermal energy and for low-loss withdrawal of the stored thermal energy, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawings, in which: the FIGURE of the drawing is a diagrammatic sectional view of the heat accumulator of the invention.

Referring now to the FIGURE of the drawing, a heat accumulator 1, according to the invention, is shown therein only as a two-dimensional structure to illustrate the operation thereof. Also shown is an energy source 2, a consumer 3 and a valve control device 4 which includes a valve 12 movable to two selective switching positions 13 and 14. Although not shown, suitable conventional pumping means may also be connected in the circulation system. For clarity of presentation, the valve 12 is shown as a switch. The heat accumulator 1 is formed of a pipeline 5 which carries the flow medium and is wound in layers in ball-like form and may be generally spiral or irregular in shape. The heat accumulator 1 also includes a pipe connection or union 7 at the outer circumference or periphery of the ball-like structure and a pipe connection or union 6 at the center or core of the ball-like structure. The pipeline 5 is embedded in earth which serves as a heat storage medium 8 and is surrounded by an insulating layer 9 which thereby separates the heat accumulator 1 from the earth or ground 10 surrounding the latter. The heat storage means 8 may have eutectic materials admixed which can be concentrated near the core or center of the ball-like structure. The insulating layer 9 may be formed of any suitable thermal insulating material.

The heat accumulator 1 is connected by the pipe connections or unions 6 and 7 to a pipe system 11. By way of the pipe system 11, the pipe connections or unions 6 and 7 can be connected, on the one hand, for storing thermal energy, respectively, to an outlet from and an inlet to the energy source 2 and, on the other hand, for surrendering thermal energy, respectively, to an inlet to and an outlet from the consumer 3. This selective connection of the heat accumulator 1 to the energy source 2 or the consumer 3 is accomplished by means of the valve control device 4.

The storing process operates as follows:

For storing thermal energy in the heat accumulator 1, the valve 12 is shifted into the position 13, as shown in the drawing, and the circulation of the flow medium between the heat accumulator 1 and the energy source 2 is established. Simultaneously, the flow direction of the flow medium is set and the flow medium, which has been heated up by the energy source 2 is conducted through the pipe system 11 and the pipe connections or unions 6 of the pipeline 5 into the core or center of the heat accumulator. Thermal energy which has been absorbed from the energy source 2 by the heat storage medium 8, is surrendered by the heat storage medium 8, through the pipeline 5 to the outer periphery of the heat accumulator 1. The cooled-off flow medium is then conducted back through the pipe connection or union 7 and the pipe system 11 to the energy source 2. This circulating process is repeated until the heat accumulator 1 has stored the desired amount of thermal energy.

The withdrawal process operates as follows:

For withdrawal, the circulation of the flow medium between the heat accumulator 1 and the consumer 3 is established by shifting the valve 12 into the position 14 thereof which simultaneously interrupts the circulation through the energy source 2. At the same time, the flow direction of the flow medium is set opposite to the flow direction during the storing process, so that the flow medium heated by the thermal energy stored in the heat accumulator 1 is drawn through the pipe connection or union 6 of the pipeline 5 from the core or center of the heat accumulator 1. After the flow medium has surrendered thermal energy to the consumer 3, it is returned through the pipe system 11 and the pipe connection or union 7 of the pipeline 5 to the outer periphery of the heat accumulator 1. In accordance with the withdrawal of thermal energy from the heat accumulator 1, the flow medium travels through the pipeline windings to the core or center of the heat accumulator 1, again absorbing thermal energy.

There is claimed:

1. Apparatus for low-loss thermal energy storage and withdrawal from a heat accumulator connected with an energy source and a heat consumer, comprising a pipeline having flow medium disposed therein and being wound layer-wise into a ball-like structure, the windings of said pipeline having an intermediate spacing, a heat storage mass disposed in said intermediate spacing, said pipeline having two ends, one of which is located at the outer periphery of said ball-like structure and the other of which is located at the center of said ball-like structure, a first pipeline union connected to said one end of said pipeline, and a second pipeline union connected to said other end of said pipeline, and means for guiding the flow medium from the energy source through said pipeline from the center to the periphery of said ball-like structure and for subsequently guiding said flow medium through said pipeline from the periphery to the center of said ball-like structure and to the heat consumer, whereby thermal energy is transferred from the energy source to the heat storage mass and from the heat storage mass to the consumer.

2. Apparatus according to claim 1 including valve means for selectively connecting, on the one hand, said first pipeline union to a pipe inlet to the energy source and said second pipeline union to a pipe outlet from the energy source and, on the other hand, said first pipeline union to the pipe outlet from the heat consumer and said second pipeline unit to a pipe inlet to the heat consumer.

3. Apparatus according to claim 1 wherein said ball-like structure has a substantially spiral configuration.

4. Apparatus according to claim 1 wherein the heat-storage mass in the spacing between said pipeline windings is earth.

5. Apparatus according to claim 1 wherein said ball-like structure and said heat storage mass disposed in the spacing intermediate the pipeline windings forming said ball-like structure constitute a heat accumulator, and said heat accumulator is received in a cavity formed in the earth.

6. Apparatus according to claim 5 including means forming a separating layer disposed between said heat accumulator received in said cavity and the earth defining said cavity.

7. Apparatus according to claim 6 wherein said separating layer is formed of insulating material.

8. Apparatus according to claim 1 wherein said heat storage mass contain an intermixed additive of eutectic material.

9. Apparatus according to claim 8 wherein said additive of eutectic material is concentrated at the center of said ball-like structure.

* * * * *